United States Patent [19]

Archer

[11] Patent Number: 4,773,386
[45] Date of Patent: Sep. 27, 1988

[54] SOLID FUEL BURNING INDUCED DRAFT STOVE

[75] Inventor: Virgil L. Archer, Dallas, Tex.

[73] Assignee: Dennis W. Whiting, Dallas, Tex.

[21] Appl. No.: 48,224

[22] Filed: May 11, 1987

[51] Int. Cl.⁴ .............................................. F24C 1/14
[52] U.S. Cl. .................................. 126/77; 126/163 R; 126/163 A; 110/300; 110/312
[58] Field of Search .................. 126/15 R, 25 R, 112, 126/77, 146, 163 R, 193, 15 A, 163 A, 242, 245; 110/297, 298, 300 X, 312 X

[56] References Cited

U.S. PATENT DOCUMENTS

| | | | |
|---|---|---|---|
| 1,548,402 | 8/1924 | Wyard | 110/298 |
| 4,212,286 | 7/1980 | Shane et al. | 126/77 |
| 4,606,282 | 8/1986 | Steindal | 110/298 |
| 4,616,627 | 10/1986 | Haywood | 126/77 |

*Primary Examiner*—Samuel Scott
*Assistant Examiner*—Noah Kamen
*Attorney, Agent, or Firm*—Hubbard, Thurman, Turner & Tucker

[57] ABSTRACT

An induced draft stove has a housing in which a food-supporting grate is disposed above a solid fuel-supporting grate. Burning solid fuel within the stove creates an induced flow of ambient combustion air to the fuel which is sequentially drawn into a pair of manually dampered inlet plenum boxes carried by the housing, through an air supply manifold, and into the open ends of a laterally spaced series of horizontally extending air delivery tubes which are removably positioned within the housing beneath the fuel grate. Combustion air entering the tubes is drawn downwardly through bottom outlet openings therein, flowed upwardly along lower exterior surface portions of the tubes, through the spaces between adjacent tube pairs, and then upwardly to the burning fuel. Upper side portions of the tubes shield the bottom outlet openings therein to prevent ash and other fuel bits falling from the fuel grate from clogging these outlet openings. Because the tube outlet openings face downwardly, air discharged therefrom is laterally spread along lower surface portions of the tubes before flowing upwardly to the fuel. This baffle effect of the tubes evenly distributes induced combustion air to the fuel, thereby substantially eliminating "hot" and "cold" spots therein and creating a uniformly distributed cooking temperature pattern within the stove. The upward flow of combustion air along the exterior surfaces of the tubes also functions to cool the tubes to substantially prolong their operating lives despite their close proximity to the burning fuel.

6 Claims, 3 Drawing Sheets

SOLID FUEL BURNING INDUCED DRAFT STOVE

BACKGROUND OF THE INVENTION

The present invention relates generally to cooking apparatus, and more particularly provides a uniquely constructed solid fuel burning induced draft stove which creates a very uniform internal induced flow of combustion air for solid fuel being burned therein, is easy to use and clean, and provides a very even cooking temperature distribution within its interior.

In the past, a variety of cooking and grilling devices have been proposed which utilize an induced or "natural draft" flow of ambient air to provide combustion air for solid fuel (such as charcoal, wood or the like) supported therein. However, a common problem encountered in such devices is the maintenance of a uniformly distributed combustion air flow across the solid cooking fuel being burned. Because of the difficulty in maintaining the desirable uniformity in internal combustion air distribution, such conventional natural draft devices have been subject to a rather wide diversity in actual cooking temperatures along the array of solid fuel therein, thereby creating undesirable "hot" and "cold" spots along the food-supporting grate positioned above the burning fuel.

One proposed solution to this combustion air and cooking temperature distribution problem, as set forth in U.S. Pat. No. 4,616,627 to Haygood, has been to utilize a fan having a variable speed motor to create a forced flow of combustion air which is directed against and then around baffle members positioned within the housing of the cooking stove below its solid fuel-supporting grate structure. While the Haygood forced draft stove to a large extent solves the combustion air and cooking temperature distribution problems inherent in conventional natural draft, solid fuel burning cooking devices, it is itself subject to several limitations and disadvantages.

For example, the use of the fan and its associated variable speed motor unavoidably adds to the cost and mechanical complexity of the cooking device. Further, the motor is periodically subjected to very high temperatures due to its proximity to the burning fuel. Accordingly, the motor is subject to rather frequent burnout and thus must be repaired or replaced with a fair degree of frequency, particularly when the stove is used in commercial cooking applications with repeated daily cooking cycles.

Additionally, the forced combustion air flow in the Haygood stove is delivered to the burning solid fuel through a spaced series of air delivery tubes which have upwardly facing forced air outlets that are positioned beneath the aforementioned air baffles. Both the air delivery tubes and their associated baffle structure are anchored to the stove housing in a manner which renders the removal, replacement and cleaning of such stove elements somewhat difficult and time-consuming, thereby further adding to the overall mechanical complexity of the stove.

Moreover, these air delivery tubes, due to their close proximity to the burning fuel above the tubes, are subject to rather rapid heat deterioration and thus must rather frequently be removed and replaced.

From the foregoing it can be readily seen that it would be desirable to provide an induced draft, solid fuel burning cooking device which provides the even combustion air and cooking temperature distribution of forced draft units, such as the Haygood stove, without the mechanical complexity, breakdown, and cleaning problems associated with such units. It is accordingly an object of the present invention to provide such a device.

SUMMARY OF THE INVENTION

In carrying out principles of the present invention, in accordance with a preferred embodiment thereof, an improved solid fuel burning induced draft stove is provided which comprises a housing having an open upper end and a combustion chamber therein. To support food items to be cooked, a food support grate structure is positioned and supported in the open upper end of the stove housing. To support solid fuel, such as mesquite wood or the like, a solid fuel support grate structure is positioned within the combustion chamber in a downwardly spaced relationship with the food support grate structure.

Air inlet plenum means are carried by the housing and have an inlet portion adapted to receive ambient air, and an outlet portion adapted to discharge the received ambient air. Damper means are provided for manually regulating the inflow of ambient air through the inlet portion of the plenum means, and air from within such plenum means is delivered to the housing combustion chamber through a series of mutually spaced induced air flow tubes which extend across the combustion chamber beneath the solid fuel support grate structure. These spaced flow tubes function to supply an induced flow of combustion air from the plenum means to burning solid fuel supported on the fuel support grate structure. Lower wall portions of the generally horizontally extending tubes have formed therethrough a plurality of downwardly facing air outlet openings. Burning of the solid fuel disposed within the combustion chamber creates an induced flow of very evenly distributed combustion air through the tubes which is drawn generally downwardly through their air outlet openings and then upwardly between each adjacent pair the tubes to the fuel supporting grate structure.

The downwardly facing orientation of the air supply outlet openings in the tubes provides a variety of structural and operational advantages in the induced draft stove of the present invention. First, because such outlet openings are downwardly facing, the upper portions of the tube means function to protect the air outlet openings from being clogged by ash and bits of burned fuel dropping through the fuel supporting grate.

Second, as the air being discharged through these outlet openings is drawn upwardly between the spaced tubes, it flows along and is laterally diverted by lower side portions of the individual tubes, thereby very evenly "spreading" the discharged air flow before it is drawn into contact with the solid fuel above. Thus, each of the tubes not only functions to deliver an induced flow of combustion air from the plenum means to the fuel, but also, in effect, functions as an air distribution and spreading baffle. Accordingly, no auxiliary baffle structure is needed to create or enhance the even distribution of combustion air to the solid fuel.

Finally, because the induced flow of combustion air discharged from each of the tubes is flowed upwardly along a substantial external surface portion of the tube before being transferred to the burning fuel, the discharged air also provides a substantial cooling effect on the tubes. This air cooling effect markedly extends the life of the tubes despite their rather close proximity to the burning fuel above. The downwardly facing discharge openings thus additionally function to protect the tubes from premature burnout.

According to a feature of the present invention, the individual tubes are secured at their opposite ends to a series of end support brackets which simply rest upon associated support sections disposed within the housing. Each of the tubes may thus be easily lifted out of the housing for cleaning or replacement purposes. The tubes each have an open end which is in registry with a corresponding opening formed through the support bracket connected to such open end of the tube.

The air outlet portion of the plenum means carried by the housing is defined by a series of outlet openings formed in a wall of a supply air manifold positioned immediately behind the support structure upon which the support brackets connected to the open ends of the tubes rest. Accordingly, when the tubes are operatively rested upon their support structure disposed within the housing, an air flow path between the plenum means and the inlet to each of the tubes is automatically established without the necessity of making any further connections between the tubes and the air supply plenum means.

During operation of the induced draft stove of the present invention, the previously described induced air flow through the tubes creates a very uniform distribution of combustion air to the fuel within the combustion chamber, thereby substantially eliminating hot and cold spots on the food supporting grate structure above.

According to another aspect of the present invention, the air supply plenum means are defined by two separate plenum boxes carried by the stove housing on opposite sides thereof, each of these separate plenums being provided with its own manually operated inlet damper means. This effectively divides the combustion chamber into two side-by-side cooking regions which may be operated simultaneously at significantly different cooking temperatures that may be very easily regulated by appropriate relative adjustment of the two manual inlet dampers. Alternatively, for smaller batches of food items to be cooked, either of these two sections may be operated, while the other section is idle, simply by placing solid fuel only on the appropriate half of the fuel supporting grate structure and closing one of the supply plenum dampers.

The stove housing may conveniently be provided with suitable ash collection drawers disposed beneath the air supply tubes so that ash and fuel particles generated during the cooking process simply fall into these drawers for subsequent removal.

DETAILED DESCRIPTION

Figure 1:
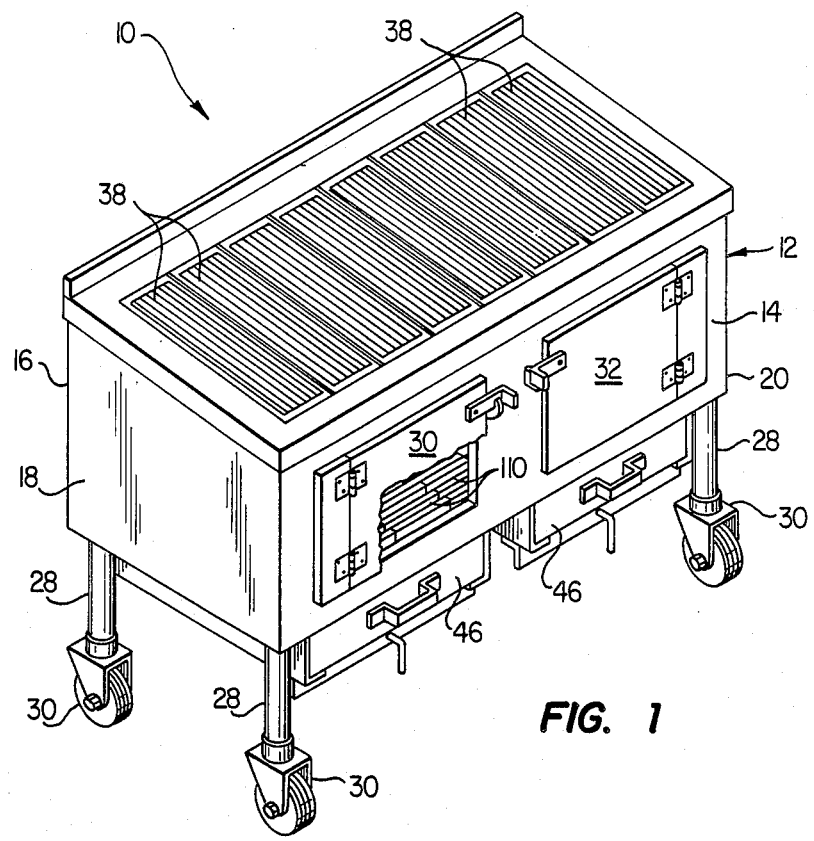
FIG. 1 is a partially cut-away top perspective view of a solid fuel burning induced draft stove which embodies principles of the present invention.
Figure 3:
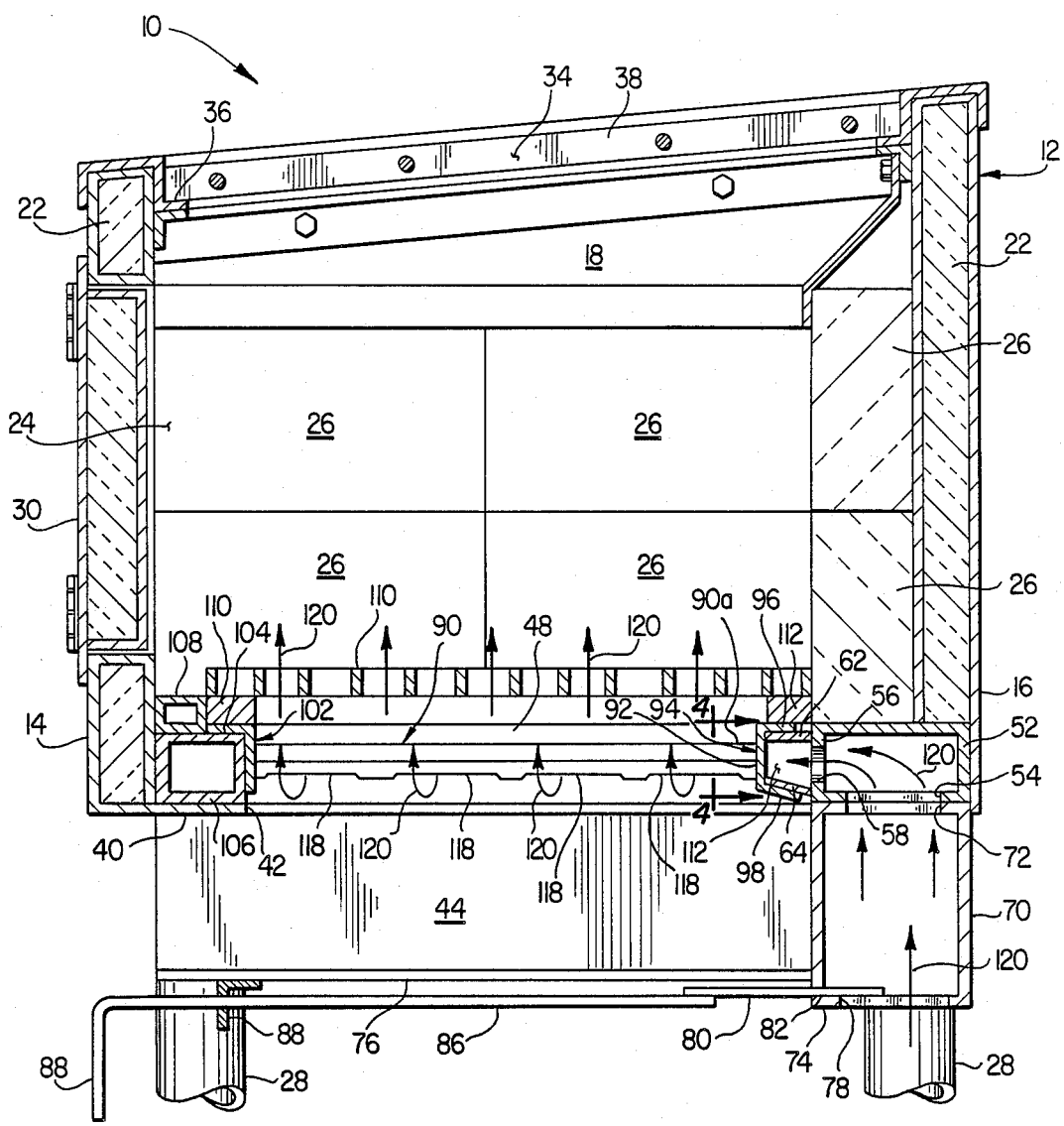
FIG. 3 is an enlarged scale cross-sectional view through the stove taken along line 3—3 of FIG. 2.
Figure 5:
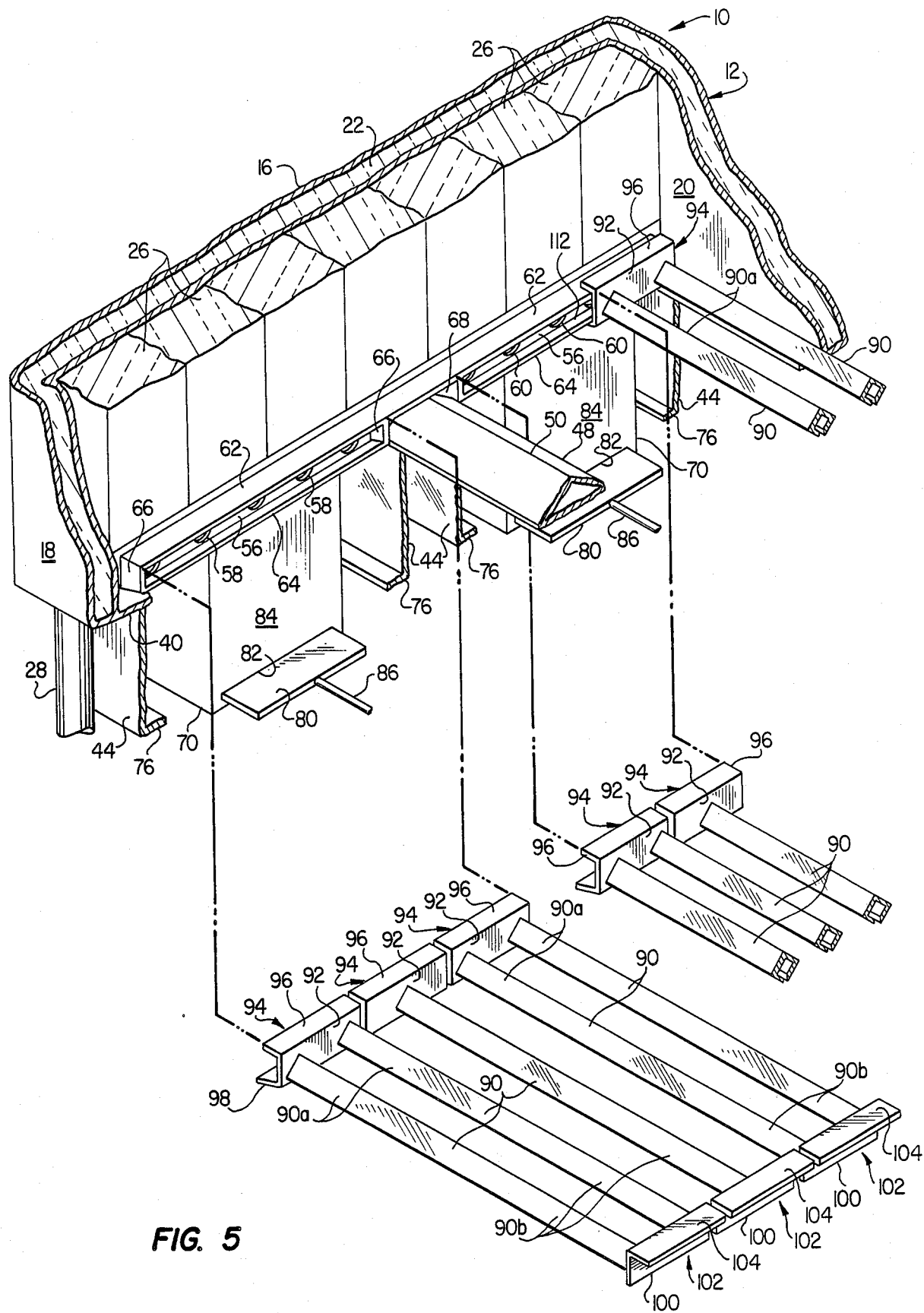
FIG. 5 is an enlarged scale, partially exploded fragmentary perspective view of a portion of the stove illustrating various details of its induced air flow supply and distribution system.

Perspectively illustrated in FIG. 1 is an induced draft stove 10 which embodies principles of the present invention and is adapted to utilize solid fuel, such as mesquite wood or the like, to grill a variety of food items such as steaks, hamburgers, chops, chicken or the like. The stove 10 has a generally rectangularly cross-sectioned housing 12 defined by the front and rear walls 14 and 16, and a pair of opposite side walls 18 and 20. These housing walls are of conventional hollow metal construction, the interiors of which have disposed therein a suitable insulating material 22 (FIGS. 3 and 5). The housing 12 defines therein a combustion chamber 24 (FIG. 3), the interior of which is lined with suitable fire brick elements 26 along the back and side wall portions of the housing. Housing 12 is supported in an elevated position by four support legs 28 positioned at the lower corners of the housing and having suitable caster elements 30 disposed at their lower ends. A pair of doors 30 and 32 are positioned on the front housing wall 14 to provide access to the combustion chamber 24.

The housing 10 has an open upper end 34 (FIG. 3) which is bordered by an internal support flange 36 that extends around the inner periphery of the housing 12 slightly below its upper end. To support food items to be cooked on the stove 10, a food supporting grate structure is provided which comprises a series of individual grate sections 38 which are received in the open upper end of the housing and rest upon the support flange 36 as best illustrated in FIG. 3. It can be seen in FIG. 3 that the upper end of the rear housing wall 16 is somewhat higher than the upper end of the front housing wall 14 so that these grate sections 38 slope downwardly and forwardly. Housing 10 is also provided with a bottom wall 40 having formed therein a pair of large rectangular openings 42 (only one of which is illustrated in the drawings) which are separated by a central portion $40_a$ of the bottom wall that extends between the front and rear walls of the housing.

Extending downwardly from the bottom housing wall 40 are two pairs of slide support brackets 44 (FIG. 2), the brackets in each pair thereof being positioned on opposite sides of one of the bottom wall openings 42 as illustrated. Each of the pairs of support brackets 44 slidingly supports an ash collection drawer 46 which is disposed beneath one of the bottom wall openings 40 and is adapted to receive ash from solid fuel burned within the oven 10 as subsequently described. Positioned above the bottom wall section $40_a$, between the bottom wall openings 40, is an elongated, generally triangularly cross-sectioned ash diverting element 48 (FIG. 5) having a central upper edge portion 50.

To provide an induced flow of ambient combustion air into the combustion chamber 24 as subsequently described, an elongated, generally rectangularly cross-sectioned air supply manifold 52 is provided (FIG. 3) which is suitably secured to the rear housing wall 16 adjacent its lower end. Formed through the bottom wall of the supply manifold 52 are a pair of longitudinally spaced inlet openings 54 (only one of which is illustrated in the drawings), the openings 54, like the supply manifold 52 itself, being positioned behind the pairs of drawer support members 44. The forwardly facing side wall 56 of the supply manifold 52 has formed therethrough two spaced series of circular openings 58 and 60 (FIGS. 3 and 5), the openings 60 being positioned to the left of the ash diverting element 48 as viewed in FIG. 5, while the openings 60 are positioned to the right of such element. Extending outwardly from the supply manifold wall 56 above the openings therein is a generally horizontally projecting support flange 62. Also projecting outwardly from the manifold wall 56, below the openings therein, is a forwardly and upwardly sloped support flange 64. As best illustrated in FIG. 5, the support flanges 62 and 64 are joined by vertically extending metal portions 66 on the left side of the ash diverting element 48, and are similarly joined to the right of such element by vertically extending metal portions 68.

Figure 2:
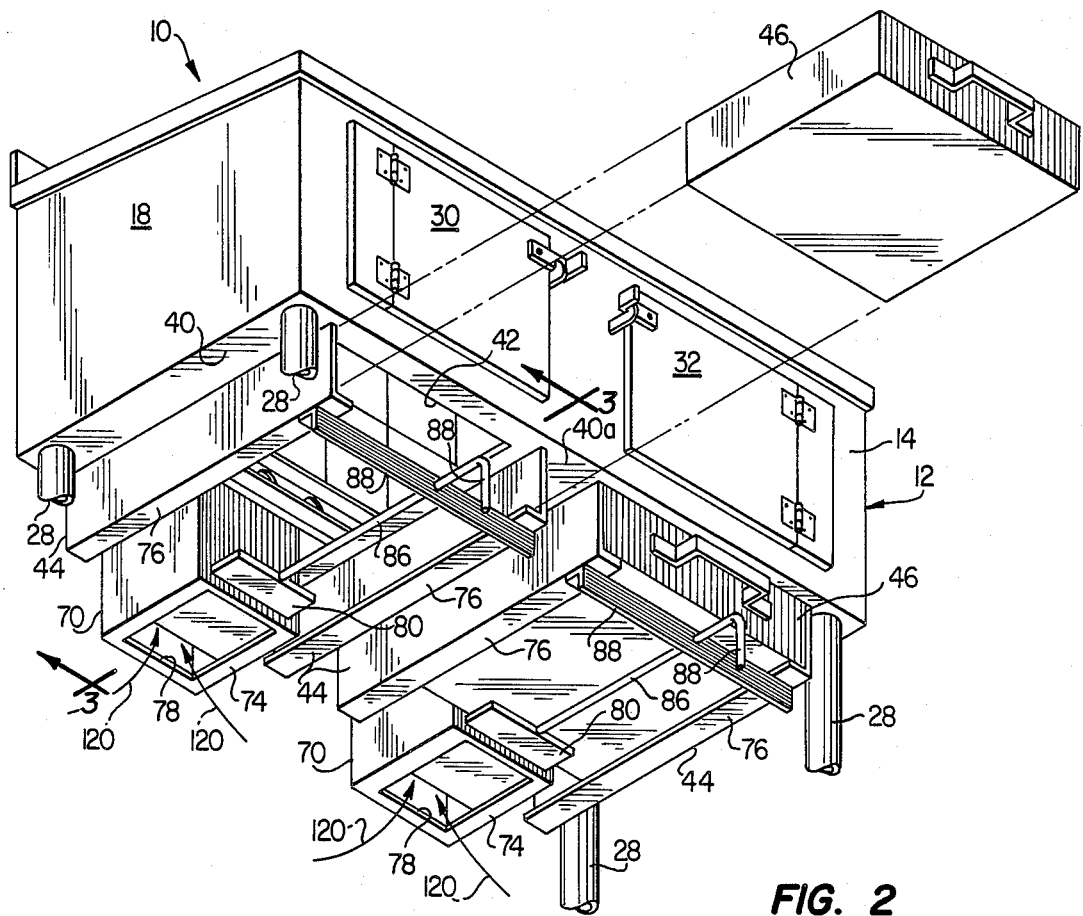
FIG. 2 is an enlarged scale, partially exploded fragmentary bottom perspective view of the stove.

A pair of generally rectangularly cross-sectioned air supply plenum boxes 70 are suitably secured to the lower wall of the supply manifold 52 and are each positioned behind one of the ash collection drawers 46. Each of the plenum boxes 70 has formed through an upper wall thereof an outlet opening 72 which registers with one of the inlet openings 54 of the supply manifold 52. Additionally, each of the plenum boxes 70 has a bottom wall 74 which is positioned somewhat below the lower ends 76 of the drawer support members 44 and has formed therethrough a suitably inlet opening 78. Plenum box inlet openings 78 may be adjustably opened or closed by means of a pair of damper plates 80 which are slidably received in suitable slots 82 formed in the front wall 84 of each of the plenum boxes 70. Damper plates 80 are suitably secured to the inner ends of a pair of damper adjusting rods 86 having opposite end portions slidably carried within suitable openings formed in a pair of support brackets 88 secured to the bottom ends 76 of the drawer support brackets 44 as best illustrated in FIG. 2. The damper adjusting rods 86 have downturned end portions 89 which project forwardly of the support brackets 88 and may be manually grasped to push or pull the damper plates 80 to accordingly vary the open area of the plenum box inlet openings 78.

To transfer ambient combustion air from the supply manifold 52 to the combustion chamber 24 within the housing 12, a spaced series of hollow combustion air flow tubes 90 (FIGS. 3 and 5) is provided. Open first end portions $90_a$ of the tubes 90 are connected to the base wall portions 92 of a series of connecting brackets 94, each of which has a flange portion 96 extending rearwardly from the upper edge of the base wall 92 and generally perpendicular thereto, and a rearwardly extending, downwardly sloped lower flange 98 extending from a lower edge portion of the base wall 92. Suitable openings are formed in the base walls 92 which register with the end openings in the portions $90_a$ of the tubes 90.

The opposite ends $90_b$ of the flow tubes 90 are secured to and closed by vertically extending leg portions 100 of a series of end support brackets 102, each of which has a horizontally outwardly projecting upper leg portion 104. As is best illustrated in FIG. 5, alternating sets of the end support brackets 94 and 102 have two of the flow tubes 90 secured thereto, while the remaining sets of brackets 94, 102 have only one of the tubes 90 secured thereto. This alternate connection of one and two flow tubes to their associated end support brackets equalizes the lateral spacing between each adjacent pair of the flow tubes. However, if desired, a variety of other connection schemes could be employed by, for example, making the end support brackets somewhat longer and connecting equal numbers of flow tube to each set of brackets. As best illustrated in FIG. 5, half of the tubes 90 are positioned on one side of the ash diverting element 48, while the remaining tubes are positioned on the other side of such element.

The flow tubes 90 are easily and conveniently installed within a lower portion of the combustion chamber 24, so that the flow tubes extend generally horizontally between the front and rear walls of the housing 12, simply by slipping the end brackets 94 of the flow tubes 90 onto the interior housing support flanges 62 and 64 so that the upper and lower flange portions 96, 98 of the brackets 94 outwardly overlap the flanges 62 and 64 as cross-sectionally depicted in FIG. 3, and then lowering the tube end brackets 102 onto a support channel member 106 positioned within the housing adjacent the juncture of its front and bottom walls 14, 40 so that the upper flange portions 104 of the end brackets 102 rest upon the support member as cross-sectionally illustrated in FIG. 3 and perspectively shown in FIG. 5.

Resting upon the support channel 106, against the interior surface of the front housing wall 14, is a smaller cross-sectioned spacing channel member 108 (FIG. 3) which is immediately adjacent an elongated support member 110 that rests upon the upper leg portions 104 of the tube end brackets 102. At the rear of the combustion chamber 24 is a similar elongated support member 112 which rests upon the upper flange portions 96 of the connecting brackets 94 at the opposite ends of the tubes. To support solid fuel, such as mesquite wood, wood chips, charcoal or the like, within a lower portion of the combustion chamber 24 above the tubes 90, a series of fuel supporting grate sections 110 are rested at their opposite ends on the elongated support members 110 and 112.

It can be seen at this point that these grate sections 110, as well as the air delivery tubes 90, are readily accessible and removable through the housing doors 30 and 32 for removal, cleaning and replacement when necessary. These stove elements are also very easily and quickly replaceable through such doors simply by dropping the tube section assemblies into place, positioning the support members 110 and 112 on top of the two end brackets, and then placing the grate sections 110 on top of the support members 110 and 112. No tools of any sort are required to effect this removal and reinstallation of the fuel support grate sections 110 and the air delivery tubes assemblies.

It is also important to note that simply by dropping the tube assemblies into place within the housing 12 as previously described, an automatic air flow connection is made between the tubes 90 and the plenum boxes 70 via the air manifold 52. Specifically, with the tube end connecting brackets 94 operatively engaged with the housing support flanges 62 and 64, the base walls 92 of the tube end connecting brackets 94 form with the flanges 62, 64 an air transfer plenum 112 (FIGS. 3 and 5) which communicates the open tube ends with the plenum boxes 70 via the air supply manifold 52. Thus, simply by dropping the tubes into place within the housing as previously described, an air flow path between the tube interiors and the interior of the plenum boxes 70 is automatically formed.

Figure 4:
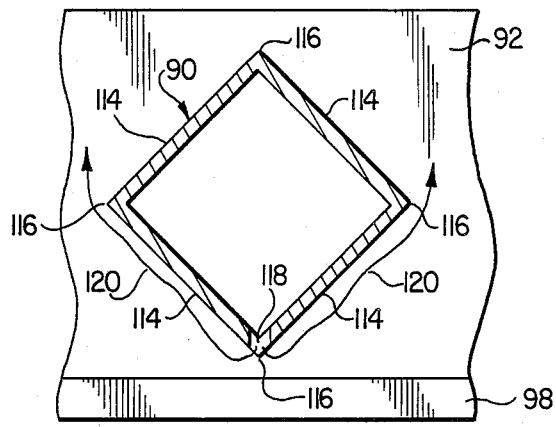
FIG. 4 is an enlarged scale cross-sectional view through one of the induced air flow delivery tubes of the stove, and an adjacent portion of its supporting structure, taken along line 4—4 of FIG. 3.

Referring now to FIG. 4, each of the air flow tubes 90 preferably has a square cross-section defined by four side walls 114 which meet at corners 116. As representatively illustrated in FIG. 4, each of the tubes 90 is oriented within the housing so that one of the corners 116 faces downwardly. Formed through this downwardly facing corner portion of tube 90 are a longitudinally spaced series of elongated air outlet slots 118 (See also FIG. 3).

To initiate operation of the induced draft stove 10, a selected solid fuel, such as mesquite wood, is evenly distributed across the top surfaces of the fuel supporting grate sections 110 and is suitably ignited. With the damper plates 80 adjusted to selected positions, the burning solid fuel creates a natural draft within the interior of the housing 12 which creates an induced flow of ambient combustion air 120 that sequentially enters the inlet openings 78 of the plenum boxes 70, flows into the transfer plenum 112 through the supply manifold 52, flows through the air delivery tubes 90 and is then downwardly drawn through their bottom corner outlet slots 118.

The burning solid fuel draws the downwardly discharged air 120 upwardly along the exterior surfaces of the two downwardly facing tube sidewalls 114 and then upwardly through the spaces between each adjacent pair of the tubes 90. The air 120 is then drawn upwardly into the burning fuel to support the combustion process therein.

Due to their orientation and configuration, the air flow tubes 90 provide the stove 10 with a variety of unique operational advantages. First, because the air outlet slots 118 face downwardly, they are upwardly shielded by the balance of their associated flow tube. Accordingly, the bodies of the tubes are positioned to prevent ash or bits of burned fuel falling through the grate sections 110 from clogging the outlet openings of the tubes. Such ash and other matter falling from the grate sections 110 during the cooking process simply strike upper portions of the tubes and fall between the tubes into the ash collection drawers 46. Ash or other fuel matter initially falling between such drawers is laterally diverted into the drawers by the ash diverting element 48.

The bodies of the air delivery tubes 90 also, in effect, function as integral air distribution baffles which serve to evenly "spread" the air 120 laterally along the air tube array. Specifically, air 120 discharged downwardly through the outlet slots 118 is initially drawn upwardly along exterior surfaces of the downwardly facing tube side walls 114 which, as best illustrated in FIG. 4, splits the air discharged from each of the slots 118 into two separate air streams that are then laterally offset at an upwardly inclined angle and flowed upwardly through the spaces between the adjacent tube pairs.

This automatic "spreading" of the combustion air flow functions to very evenly distribute the combustion air along the undersurface of the burning fuel. This even distribution of the combustion air to the fuel promotes a uniformly distributed burning pattern thereto. In turn, the even fuel burning pattern creates within the combustion chamber a surprisingly uniform cooking temperature distribution such that regardless of where food items are placed on the upper food supporting grate sections 38, they are subjected to substantially the same cooking and grilling temperature.

This evenly distributed cooking temperature may be easily and conveniently altered simply by repositioning the damper plates 80 as desired to manually alter the combustion air flow rate through the stove 10. As previously described, in the illustrated embodiment of the induced draft stove of the present invention, two air supply plenum boxes 70 are provided in a spaced, side-by-side relationship. This placement of the two plenum boxes in effect divides the combustion chamber 24 into two side-by-side portions which may be operated to generate substantially different uniformly distributed cooking temperatures, if desired, simply by relatively adjusting the air flows through the two plenum boxes to different rates.

Alternatively, if desired, solid fuel can be placed only on one side portion of the fuel supporting grate structure, and the plenum box on the other side can be closed, to thereby operate only half of the stove for smaller food batches. While the stove 10 has been representatively illustrated with two separate plenum boxes, it will be readily appreciated that it could be alternatively constructed in a larger size having more than two plenum boxes, or could be constructed in a smaller size having only one plenum box.

The downwardly facing corner outlet slots 118 in the tubes 90 provide yet another very advantageous operational feature - namely, the automatic cooling and protection against premature burnout of the tubes. Specifically, because the air 120 discharged from these slots 118 is caused to flow upwardly along the downwardly facing sidewalls 114 of the tubes before being drawn upwardly into the burning fuel above the tubes, the combustion air also functions to absorb a substantial amount of heat from the tubes before being drawn into the burning fuel. This unique air cooling effect substantially prolongs the useful life of the tubes despite their proximity to the burning fuel.

While the tubes 90 have been depicted as having a square cross-section, it will be appreciated that a variety of alternate cross-sectional configurations could alternately be employed if desired and still provide at least a substantial measure of the unique combustion air spreading and cooling effects described above.

From the foregoing it can be seen that the present invention provides an improved solid fuel burning induced draft stove which is very easy to operate, is of very simple and rugged construction, and provides the even combustion air and cooking temperature distribution advantages normally associated with more expensive, mechanically complex, and maintenance prone forced draft units.

The foregoing detailed description is to be clearly understood as given by way of illustration and example only, the spirit and scope of the present invention being limited solely by the appended claims.

What is claimed is:

1. Induced draft, solid fuel burning cooking apparatus comprising:
   wall means for defining a combustion chamber having an open upper end;
   food support means, extending across said combustion chamber, for supporting food items to be cooked by said apparatus;
   solid fuel support means, extending across said combustion chamber below said food support means, for supporting solid fuel to be burned within said combustion chamber;
   a laterally spaced series of air delivery tube means, extending generally horizontally within said combustion chamber beneath said solid fuel support means, for internally receiving an induced flow of ambient combustion air and delivering the received combustion air to burning solid fuel operatively positioned on said solid fuel support means, said tube means having generally downwardly facing wall portions through which air outlet openings are formed, said tube means further being configured in a manner such that burning fuel within said combustion chamber draws combustion air from within said tube means downwardly through said outlet openings, upwardly and laterally outwardly across the exterior surface of said generally downwardly facing wall portions to cool the same and to laterally spread the combustion air flow, and then upwardly through the spaces between adjacent pairs of said tube means and onto the burning fuel;

flow control means for selectively regulating the induced flow of combustion air through said tube means, said flow control means including supply plenum means carried by said wall means and having an inlet portion adapted to receive an inflow of ambient air and an outlet portion communicating with the interiors of said tube means, and damper means operable to selectively vary the open area of said inlet portion of said supply plenum means, said outlet portion of said supply plenum means communicating with the interiors of said tube means through a supply manifold carried by said wall means; and first and second tube support means, upon which opposite end portions of said tube means are adapted to rest, for removably supporting said tube means within said combustion chamber and establishing an air flow connection between said supply manifold and the interiors of said tube means.

2. The cooking apparatus of claim 1 wherein:

said supply manifold has a generally horizontally facing wall portion having a series of outlet openings formed therethrough, said first tube support means include flange means projecting outwardly from said wall portion above and below said outlet openings therein, and first end portions of said tube means are open and are secured to a first series of end support brackets adapted to removably engage said flange means and form therewith a transfer plenum communicating said first end portions with said outlet openings in said wall portion of said supply manifold.

3. The cooking apparatus of claim 2 wherein:

said second tube support means include a support member carried within said combustion chamber, and second end portions of said tube means are secured to a second series of end support brackets adapted to removably rest upon said support member.

4. Induced draft, solid fuel burning cooking apparatus comprising:

wall means for defining a combustion chamber having an open upper end;

food support means, extending across said combustion chamber, for supporting food items to be cooked by said apparatus;

solid fuel support means, extending across said combustion chamber below said food support means, for supporting solid fuel to be burned within said combustion chamber;

a laterally spaced series of air delivery tube means, extending generally horizontally within said combustion chamber beneath said solid fuel support means, for internally receiving an induced flow of ambient combustion air and delivering the received combustion air to burning solid fuel operatively positioned on said solid fuel support means, said tube means having generally downwardly facing wall portions through which air outlet openings are formed, said tube means further being configured in a manner such that burning fuel within said combustion chamber draws combustion air from within said tube means downwardly through said outlet openings, upwardly and laterally outwardly across the exterior surface of said generally downwardly facing wall portions to cool the same and to laterally spread the combustion air flow, and then upwardly through the spaces between adjacent pairs of said tube means and onto the burning fuel;

flow control means for selectively regulating the induced flow of combustion air through said tube means, said flow control means including supply plenum means carried by said wall means and having an inlet portion adapted to receive an inflow of ambient air and an outlet portion communicating with the interiors of said tube means, and damper means operable to selectively vary the open area of said inlet portions of said supply plenum means; and cooperating means, positioned on opposite ends of said tube means and carried by said wall means, for permitting a drop-in installation within and a lift-out removal from said combustion chamber of said tube means, and for creating an automatic air flow connection between the installed tube means and said supply plenum means.

5. induced draft, solid fuel burning cooking apparatus comprising:

wall means for defining a combustion chamber having an open upper end;

food support means, extending across said combustion chamber, for supporting food items to be cooked by said apparatus;

solid fuel support means, extending across said combustion chamber below said food support means, for supporting solid fuel to be burned within said combustion chamber;

a laterally spaced series of air delivery tube means, extending generally horizontally within said combustion chamber beneath said solid fuel support means, for internally receiving an induced flow of ambient combustion air and delivering the received combustion air to burning solid fuel operatively positioned on said solid fuel support means, said tube means having generally downwardly facing wall portions through which air outlet openings are formed, said tube means further being configured in a manner such that burning fuel within said combustion chamber draws combustion air from within said tube means downwardly through said outlet openings, upwardly and laterally outwardly across the exterior surface of said generally downwardly facing wall portions to cool the same and to laterally spread the combustion air flow, and then upwardly through the spaces between adjacent pairs of said tube means and onto the burning fuel; and flow control means for selectively regulating the induced flow of combustion air through said tube means, said flow control means including supply plenum means carried by said wall means and having an inlet portion adapted to receive an inflow of ambient air and an outlet portion communicating with the interiors of said tube means, and damper means operable to selectively vary the open area of said inlet portion of said supply plenum means, said wall means including a bottom wall positioned below said tube means and having at least one opening formed therethrough, said cooking apparatus further comprising ash collection drawer means slidably supported beneath said at least one opening, and said damper means including damper plate means slidably carried by said supply plenum means and secured to manual actuating rod means extending beneath said ash collection drawer means.

6. A method of providing an induced flow of ambient combustion air to burning solid fuel disposed within a combustion chamber portion of a cooking device having support means therein, said method comprising the steps of:

providing a series of air flow delivery tubes having side wall portions with outlet openings formed therethrough;

connecting support elements to the opposite ends of the tube;

positioning said air flow delivery tubes beneath the burning fuel in a generally horizontally disposed, laterally spaced array with said outlet openings facing generally downwardly;

utilizing the burning fuel to create an induced flow of ambient combustion air through said flow delivery tubes, downwardly through said outlet openings, upwardly along lower exterior side surface portions of said tubes into the spaces between adjacent pairs thereof, and then upwardly to the burning fuel; and providing means for regulating the induced flow of combustion air through the tubes, said step of providing means for regulating including the steps of providing supply plenum means having damper means operatively associated therewith, and communicating the interiors of the tubes with said supply plenum means, said communicating step being performed by resting the support elements on the support means.

* * * * *